United States Patent
Yeh et al.

(10) Patent No.: US 9,563,108 B2
(45) Date of Patent: Feb. 7, 2017

(54) IMAGING DEVICE AND FIXING DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Chin-Wen Yeh, New Taipei (TW); Dun-Jun Zhou, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 212 days.

(21) Appl. No.: 14/585,424

(22) Filed: Dec. 30, 2014

(65) Prior Publication Data

US 2016/0147133 A1    May 26, 2016

(30) Foreign Application Priority Data

Nov. 24, 2014  (CN) .......................... 2014 1 0678742

(51) Int. Cl.
G03B 21/20 (2006.01)
F21V 15/01 (2006.01)
G03B 21/14 (2006.01)

(52) U.S. Cl.
CPC ............. *G03B 21/145* (2013.01); *F21V 15/01* (2013.01); *G03B 21/20* (2013.01)

(58) Field of Classification Search
CPC ... G03B 21/20; G03B 21/2026; G03B 21/202; G03B 21/2093; G03B 21/145; H04N 9/315; F21V 15/01; F21V 21/00
USPC .................................... 362/362; 353/85, 119
See application file for complete search history.

(56) References Cited

U.S. PATENT DOCUMENTS

| 7,241,029 | B2 * | 7/2007 | Tsai | G03B 21/145 |
|---|---|---|---|---|
|  |  |  |  | 353/119 |
| 2002/0008975 | A1 * | 1/2002 | Uedono | F21S 8/02 |
|  |  |  |  | 362/376 |
| 2007/0182301 | A1 * | 8/2007 | Yamauchi | H01J 61/025 |
|  |  |  |  | 313/113 |

* cited by examiner

*Primary Examiner* — William C Dowling
*Assistant Examiner* — Ryan Howard
(74) *Attorney, Agent, or Firm* — Zhigang Ma

(57) ABSTRACT

An imaging device includes a base, an illuminating device, a first housing element, and a second housing element. The first housing element defines a cutout. The first housing element further includes at least one fixing piece from an edge of the first housing element. The second housing element is similar configuration to the first housing element. When the first housing element is fixed to the second housing element, the two cutouts defines an engaging hole, the illuminating device extends from the engaging hole from the base, the two fixing pieces engage with the illuminating device to fix the illuminating device to the base.

18 Claims, 3 Drawing Sheets

IMAGING DEVICE AND FIXING DEVICE

CROSS-REFERENCE TO RELATED APPLICATIONS

This application claims priority to Chinese Patent Application No. 201410678742.X filed on Nov. 24, 2014, the contents of which are incorporated by reference herein.

FIELD

The subject matter herein generally relates to imaging devices.

BACKGROUND

An imaging device, such as a projector, generally includes an imaging module, a control module configured to control the imaging module, and a power supply configured to supply power to the imaging module and the control module. The imaging module, the power supply, and the control module are located in a housing element of the imaging device.

BRIEF DESCRIPTION OF THE DRAWINGS

Implementations of the present technology will now be described, by way of example only, with reference to the attached figures.

DETAILED DESCRIPTION

Figure 1:
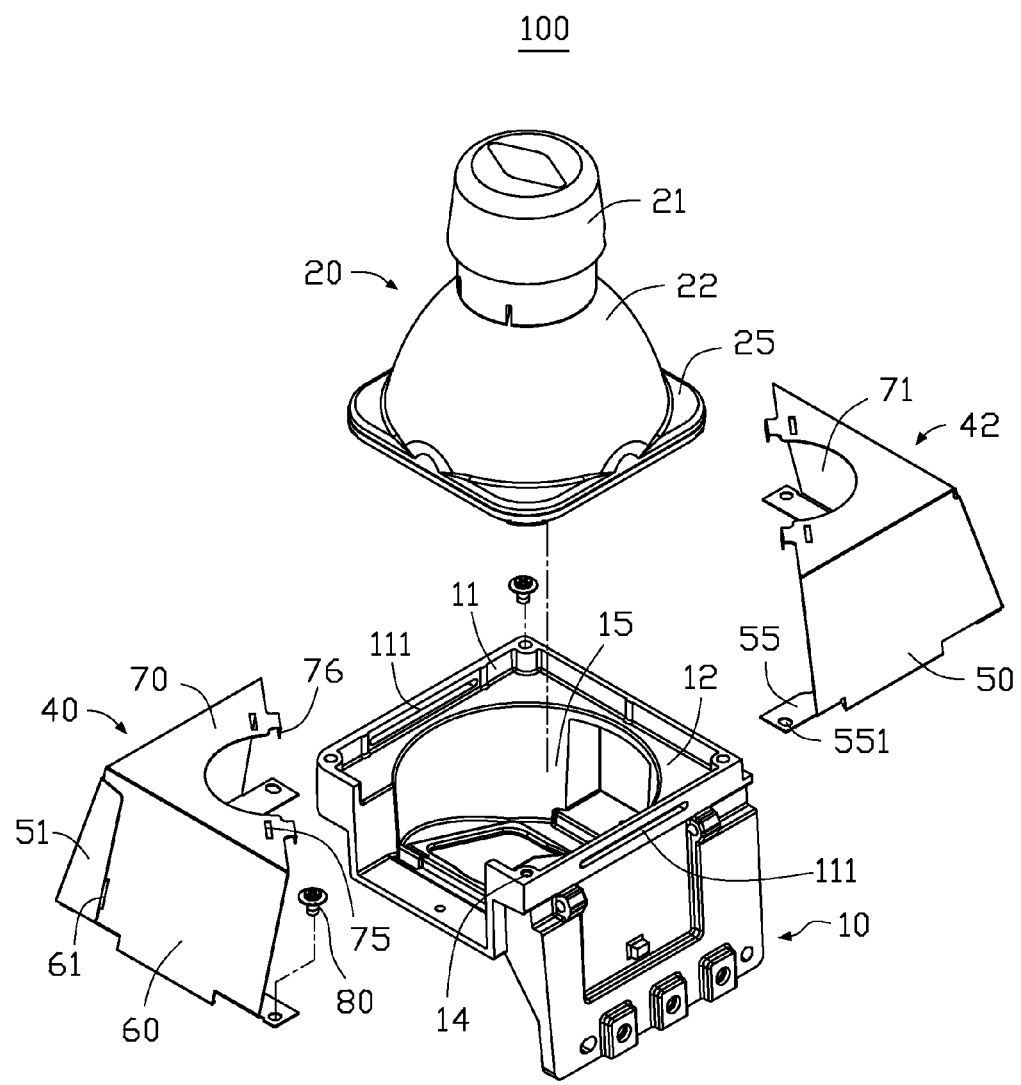
FIG. 1 is an exploded, isometric view of one embodiment of an imaging device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an imaging device.

Figure 2:
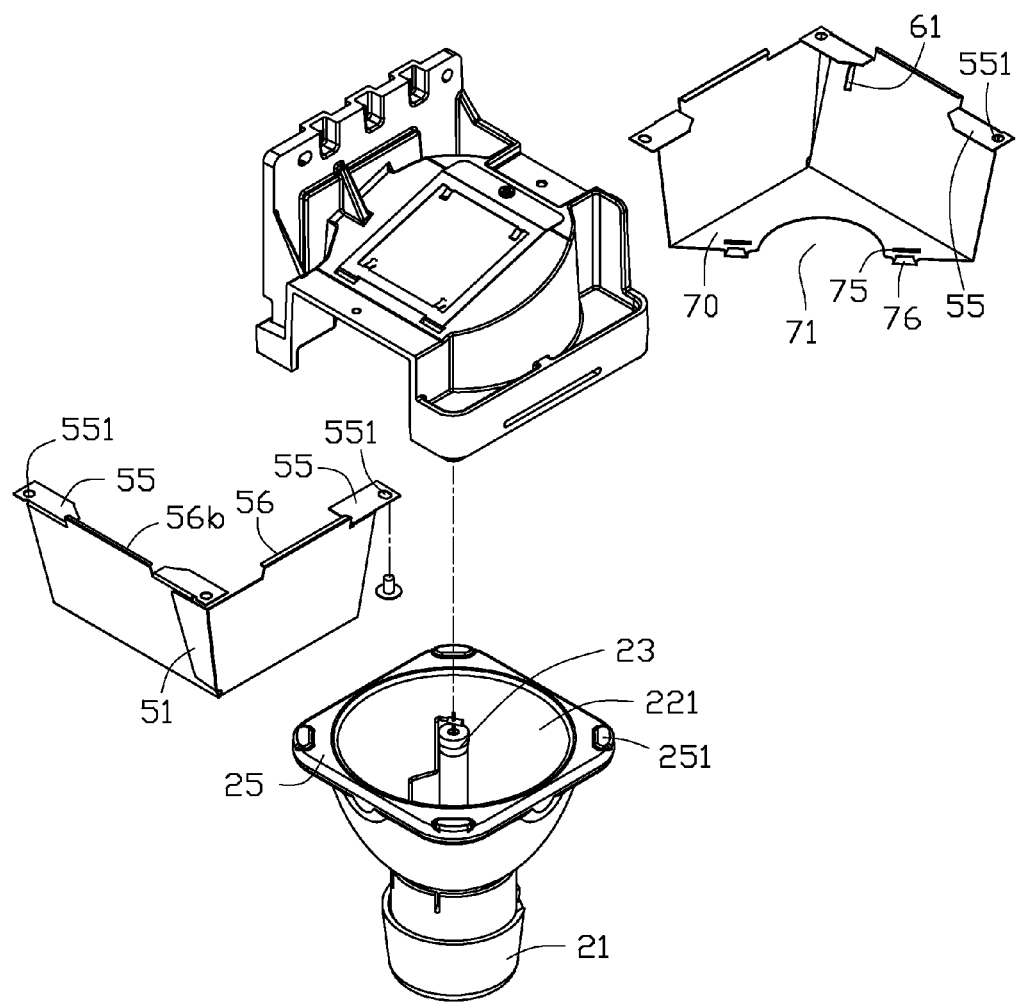
FIG. 2 is similar to FIG. 1, but viewed from a different angle.

FIGS. 1 and 2 illustrate one embodiment of an imaging device 100 can include a base 10, an illuminating device 20, a first housing element 40, and a second housing element 42. The illuminating device 20 is fixed to the base 10. In at least one embodiment, the imaging device 100 is a projector.

The base 10 includes three baffles 11, extending substantially perpendicular to each other, and cooperatively defining a receiving space 12. The illuminating device 20 is partly located in the receiving space 12. Each baffle 11 defines an assembly groove 111. The base 10 defines two fixing holes 14 and a hole 15. The hole 15 communicates with the receiving space 12.

The illuminating device 20 includes a connecting portion 21, a lampshade 22, and a bulb 23. The bulb 23 is received in the lampshade 22. The connecting portion 21 connects to the bulb 23 by a wire. The lampshade 22 is fixed to the connecting portion 21. The lampshade 22 defines an accommodating space 221. The surface of the lampshade 22 is substantially a paraboloid. The bulb 23 is received in the accommodating space 221. The paraboloid of the accommodating space 221 can reflect the light from the bulb 23. The illuminating device 20 further includes a fixing plate 25. The fixing plate 25 extends from the edge of the lampshade 22. The fixing plate 25 includes four gaskets 251. The four gaskets 251 can be elastically deformable to prevent an abrasion of the illuminating device 20.

The first housing element 40 includes a first plate 50, a second plate 60, and an assembly piece 70. The first plate 50 includes a connecting piece 51. The connecting piece 51 is located on one end of the first plate 50. The second plate 60 defines an opening 61. The connecting piece 51 extends into the opening 61 to fix the first plate 50 to the second plate 60. The edge of the first plate 50 and the second plate 60 bends forming a plurality of fixing pieces 55. Each fixing piece 55 can abut the fixing plate 25 of the illuminating device 20. Each fixing piece 55 defines an alignment hole 551. A screw 80 passes from the alignment hole 551 into the fixing hole 14 to fix the first housing element 40 to the base 10. A bottom of the first plate 50 includes a bent piece 56. A bottom of the second plate 60 includes a bent piece 56b. The bent piece 56 and the bent piece 56b are elastically deformable and engage with the assembly groove 111 fixing the first housing element 40. The assembly piece 70 defines a cutout 71. The connecting portion 21 is received in the two cutouts 71. The assembly piece 70 defines two locking holes 75. The assembly piece 70 includes two bent pieces 76. The second housing element 42 is similar configuration to the first housing element 40.

Figure 3:
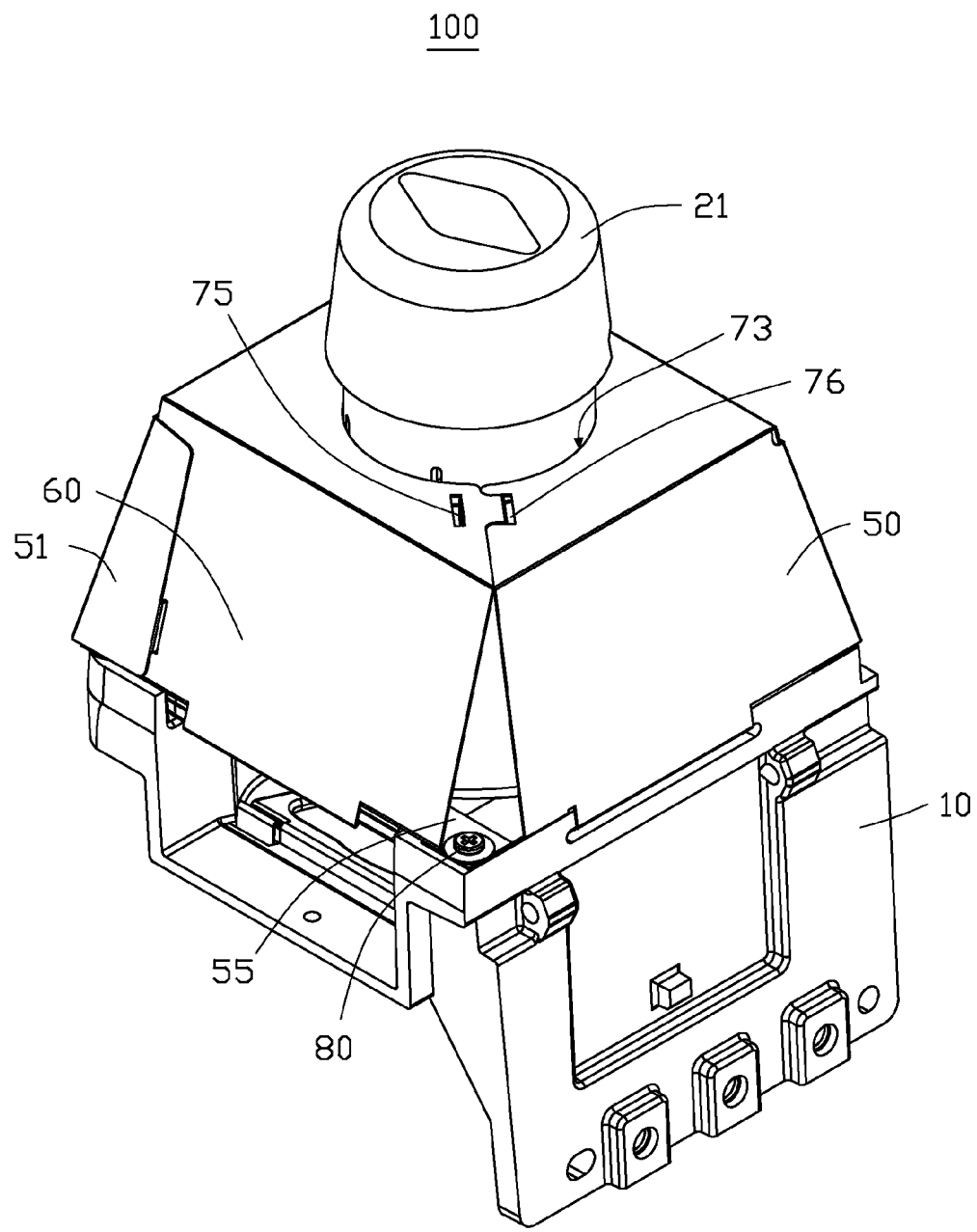
FIG. 3 is an assembled, isometric view of the imaging device of FIG. 1.

FIG. 3 illustrates view of the assembled imaging device 100. In assembly, the lampshade 22 is fixed to the connecting portion 21. The bulb 23 is received in the accommodating space 221 of the lampshade 22. The fixing plate 25 of the illuminating device 20 is received in the receiving space 12 of the base 10. The four gaskets 251 are aligned with the surface of the base 10. Each fixing piece 55 abuts the fixing plate 25. The alignment hole 551 of the fixing piece 55 is aligned with the fixing hole 14 of the base 10. The bent piece 56 and the bent piece 56b are engaged with the assembly groove 111. Two bent pieces 76 of the first housing element 40 are engaged with the two locking holes 75 of the second housing element 42 fixing the first housing element 40 to the second housing element 42. When the first housing element 40 is fixed to the second housing element 42, the two cutouts 71 of the first housing element 40 and the second housing element 42 define an engaging hole 73. The illuminating device 20 extends from the engaging hole 73 extending from the base 10. The screw 80 extends from the alignment hole 551 into the fixing hole 14 fixing the first housing element 40 and the second housing element 42 to the base 10.

FIG. 2 also illustrates one embodiment of a fixing device can include a base 10, a first housing element 40, and a second housing element 42. The base 10, the first housing element 40, and the second housing element 42 are used to fix an illuminating device 20.

The embodiments shown and described above are only examples. Many details are often found in the art such as the other features of an imaging device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An imaging device comprising:
   a base;
   an illuminating device located on the base;
   a first housing element located on the base, the first housing element defining a cutout, and the first housing element comprising at least one fixing piece from an edge of the first housing element; and
   a second housing element located on the base, the second housing element defining a cutout, and the second housing element comprising at least one fixing piece from an edge of the second housing element;
   wherein the first housing element and the second housing element are fixed to each other, the two cutouts of the first housing element and the second housing element define an engaging hole, the illuminating device extends from the engaging hole from the base, the two fixing pieces of the first housing element and the second housing element engage with the illuminating device to fix the illuminating device to the base.

2. The imaging device of claim 1, wherein the base defines at least one fixing hole, the at least one fixing piece defines an alignment hole, and a screw passes from the alignment hole into the fixing hole to fix the first housing element and the second housing element to the base.

3. The imaging device of claim 2, wherein the first housing element comprises an assembly piece, and the second housing element comprises an assembly piece, each assembly piece defines the cutout and at least one locking hole, and each assembly piece further comprises at least one bent piece, the bent piece of the first housing element is engaged with the locking hole of the second housing element.

4. The imaging device of claim 3, wherein the first housing element further comprises a first plate and a second plate, and the assembly piece connects the first plate to the second plate.

5. The imaging device of claim 4, wherein the first plate comprises a connecting piece, the second plate defines an opening, and the connecting piece is bent and is engaged with the opening to fix the first plate to the second plate.

6. The imaging device of claim 4, wherein the base comprises three baffles, two of the three baffles define two assembly grooves, the first plate and the second plate comprise two bent pieces, and the two bent pieces are elastically deformable and are engaged with the two assembly grooves to fix the first housing element to the base.

7. The imaging device of claim 6, wherein the three baffles cooperatively define a receiving space, and the illuminating device is partly received in the receiving space.

8. The imaging device of claim 1, wherein the illuminating device comprises a connecting portion, the two cutouts are aligned together and are sheathed with the connecting portion to fix the illuminating device.

9. The imaging device of claim 8, wherein the illuminating device further comprises a bulb and a lampshade, the bulb and the lampshade are fixed to the connecting portion, and the lampshade is configured to reflect the light from the bulb.

10. The imaging device of claim 9, wherein the illuminating device further comprises a fixing plate, the fixing plate extends from the edge of the lampshade, and the at least one fixing piece abuts the fixing plate to fix the illuminating device.

11. A fixing device comprising:
   a base;
   a first housing element located on the base, the first housing element defining a cutout, and the first housing element comprising at least one fixing piece from an edge of the first housing element; and
   a second housing element located on the base, the second housing element defining a cutout, and the second housing element comprising at least one fixing piece from an edge of the second housing element;
   wherein the first housing element and the second housing element are fixed to each other, the two cutouts of the first housing element and the second housing element define an engaging hole, an illuminating device extends from the engaging hole from the base, the two fixing pieces of the first housing element and the second housing element are fixed to each other, the two cutouts of the first housing element and the second housing element define an engaging hole engages with the illuminating device to fix the illuminating device to the base.

12. The fixing device of claim 11, wherein the base defines at least one fixing hole, the each fixing piece defines an alignment hole, and a screw passes from the alignment hole into the fixing hole to fix the first housing element and the second housing element to the base.

13. The fixing device of claim 12, wherein the first housing element comprises an assembly piece, and the second housing element comprises an assembly piece, each assembly piece defines the cutout and at least one locking hole, and each assembly piece further comprises at least one bent piece, the bent piece of the first housing element is engaged with the locking hole of the second housing element.

14. The fixing device of claim 13, wherein the first housing element further comprises a first plate and a second plate, and the assembly piece connects the first plate to the second plate.

15. The fixing device of claim 14, wherein the first plate comprises a connecting piece, the second plate defines an opening, and the connecting piece is bent and is engaged with the opening to fix the first plate to the second plate.

16. The fixing device of claim 14, wherein the base comprises three baffles, two of the three baffles define two assembly grooves, the first plate and the second plate comprise two bent pieces, and the two bent pieces are elastically deformable and are engaged with the two assembly grooves to fix the first housing element to the base.

17. The fixing device of claim 16, wherein the three baffles cooperatively define a receiving space, and the illuminating device is partly received in the receiving space.

18. An imaging device comprising:
   a first housing element attached to a second housing element to form a defined interior space, a first cutout in the first housing element cooperating with a second cutout in the second housing element to form an engaging hole at a first end of the defined interior space, the second housing element end being opposite and substantially parallel to the first housing element end;
   a base attached to the first housing element and the second housing element and positioned opposite the engaging hole; and
   an illuminating device positioned substantially within the defined space with the engaging hole fixing the illuminating device against the base.

* * * * *